Patented Feb. 9, 1943

2,310,640

UNITED STATES PATENT OFFICE 2,310,640

PRODUCTION OF COMPOUNDS OF THE CYANINE TYPE

John David Kendall, Ilford, England, assignor to Ilford Limited, Ilford, England, a British company No Drawing. Application May 12, 1934, Serial No. 725,412. In Great Britain May 18, 1933

5 Claims. (Cl. 260—240)

This invention relates to the production of compounds, particularly dyes, of the cyanine type, that is compounds in which two heterocyclic nuclei are joined by a methine group or by a chain containing methine groups.

According to the present invention a process for the production of dyes of the cyanine type consists in reacting the quaternary ammonium salt of an α- or γ-alkyl-thioether of a heterocyclic nitrogen base with a quaternary cyclic ammonium salt having a reactive methyl group.

The thioethers may be prepared from the mercapto bodies derived from any of the heterocyclic nitrogen bases for example such as unsubstituted or substituted thiazoles, thiazolines, oxazoles, oxazolines, selenazoles, selenazolines, quinolines, indolenines and pyridines. The substituent radicals may be alkyl, aralkyl or aryl and the compounds more particularly contemplated for employment in the process according to the invention are, for example, the derivatives of the polycyclic compounds such as benzthiazole, naphthiazole, benzoxazole, or naphthoxazole, which, if desired, may be substituted in the carbocyclic rings. The substituent groups may be any one or more of the following (among others): hydroxy, alkoxy, halogen, alkyl, aryl, aralkyl, amino, or substituted amino.

The following references are given for the methods of preparation of the various mercapto bodies mentioned above:

Mercapto oxazole compounds—Beilstein, vol. II, 1896, pages 710, 753, 865 and 885.
Mercapto benzthiazoles, etc.—Beilstein vol. II, 1896, pages 797, 871 and 889.
Mercapto thiazolines—Beilstein, vol. I, 1893, page 1262.
Mercapto quinoline—Beilstein, vol. IV., 1899, pages 291 and 313.
Mercapto pyridine—Beilstein, vol. IV, 1906, page 97.
Mercapto thiazole—Richter, vol. III, page 118.

The thioether group in the majority of cases will be attached to the carbon atom adjacent to the nitrogen atom but, where the structure of the molecules permits, it may be attached to a carbon atom in the gamma position with respect to the nitrogen.

Such thioether compounds can be condensed with the quaternary ammonium salts of any of the heterocyclic nitrogen bases enumerated above such as quinoline, pyridine, thiazoles, benzthiazoles or the like, having a reactive methyl substituent in the alpha or gamma position with respect to the nitrogen atom.

It has been found that the quaternary salts of these thioethers may be readily obtained by any of the known methods, for example by alkylation of the corresponding mercapto bodies which are obtainable commercially or which may be easily prepared by known methods. As an example 1-mercapto benzthiazole, which is available commercially, was methylated by treatment with methyl sulphate in the presence of alkali to form the thioether and this, on heating with excess ethyl iodide under a reflux for 24 hours, gave 1-methylmercaptobenzthiazole ethiodide. These reactions may be illustrated as follows:

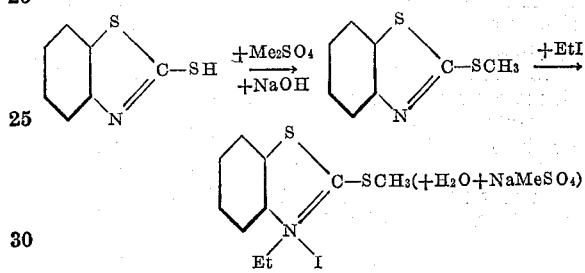

Such compounds are readily soluble and extremely reactive and may be condensed with the quaternary ammonium salts of any of the nitrogen heterocyclic bases containing a reactive methyl group. The condensation may be effected by dissolving the two substances in any suitable solvent for example alcohol or even water, and mixing the solutions containing approximately molecular equivalents in the presence of an acid binding agent, for example sodium acetate. Alternatively a solvent, such as pyridine, may be employed which itself constitutes the acid binding agent.

As an example, the quaternary salt 1-methylmercaptobenzthiazole ethiodide, whose production is outlined above can be condensed with approximately a molecular equivalent of a quaternary cyclic ammonium salt having a reactive methyl group such as 1-methyl-benzthiazole-ethiodide in solution in the presence of an acid binding agent, when the following reaction is believed to take place with the formation of a dye and the elimination of methyl mercaptan and hydrogen iodide which is dissolved in the acid binding agent:

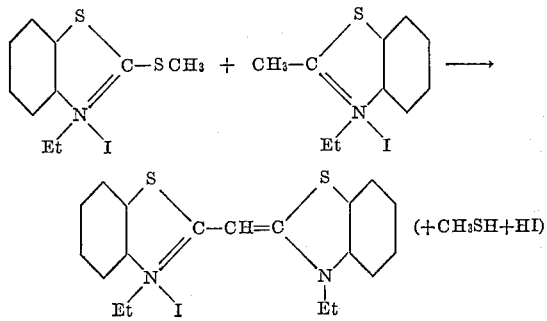

As an alternative to the method described above, in the case of condensation of two compounds having the same radicles attached to the nitrogen atom to form the quaternary salts, the reaction may be carried out by mixing the heterocyclic nitrogen body and the thioether together with the salt required to form the quaternary salts of these bodies and heating the whole mass, when the quaternary salts will be formed and a certain amount of condensation will take place to form the dyes. The condensation is then completed by the addition of a suitable solvent and an acid binding substance, if necessary.

The process according to the invention is of universal application but is of particular importance in the production of cyanine dyestuffs.

The invention permits the production not only of a number of compounds whose production by other methods has already been described but also the production of a wide field of entirely new compounds. The condensation of two quinoline nuclei to produce the known compound pseudo-cyanine, for example, can be effected according to the invention by condensing 1-methylmercaptoquinoline ethiodide with quinaldine ethiodide.

The invention can be further applied to condense a quinoline nucleus with one of the nuclei benzthiazole, selenazole, indole or benzoxazole or the like. In addition symmetrical or unsymmetrical compounds may be produced which contain any two of the nuclei benzthiazole, selenazole, indole or benzoxazole.

EXAMPLE I

A mixture of 3.37 grams (1 mol.) 1-methyl-mercapto-benzthiazole ethiodide and 2.08 grms. (1 mol.) quinaldine ethochloride were dissolved by heating in 80 ccs. of dry spirit and 0.82 gram (1 mol.) of anhydrous sodium acetate added. The solution immediately acquired a deep orange colour, methyl-mercaptan was evolved, and a red solid began to deposit. After refluxing the mixture for 15 minutes it was inverted over a beaker and water added to complete precipitation of the dyestuff, which was then filtered.

The dyestuff was recrystallised from hot methyl alcohol and was similar in all respects to the dyestuff known as 1'.2-diethyl-thiopseudocyanine-iodide.

EXAMPLE II

A mixture of 3.37 grams (1 mol.) 1-methyl-mercapto-benzthiazole-ethiodide and 3.39 grms. (1 mol.) 2-methyl-β-naphthoxazole-ethiodide were dissolved by refluxing in 70 ccs. of dry spirit, and 0.82 grm. (1 mol.) of anhydrous sodium acetate added. Methyl mercaptan was evolved and a yellow solution obtained. After 20 minutes refluxing the solution was poured into a beaker and water added to precipitate the dyestuff completely. The yellow dyestuff obtained after filtration may be recrystallised from 50% aqueous alcohol when it is obtained in the form of pale yellow crystals.

The dyestuff which may be termed 2.2'-diethyl 3'.4'-thiobenzoxacyanine iodide gives a pale yellow spirit solution which possesses an absorption band at the violet end of the spectrum, and is a photographic sensitizer for silver chloride emulsions having a sensitizing maximum at about λ 4300 Å.

EXAMPLE III

A mixture of 3.37 grms. (1 mol.) 1-methyl-mercapto-benzthiazole-ethiodide, and 3.01 grms. (1 mol.) 2.3.3-trimethyl-indolenine-methiodide were dissolved by refluxing with 40 ccs. of dry spirit, and 0.82 grm. (1 mol.) of anhydrous sodium acetate added. The solution became deep yellow and methyl mercaptan was evolved. After refluxing for 15 minutes, the solution was poured into a beaker and water added to precipitate the dyestuff completely. The bright orange solid obtained after filtration was recrystallised from 50% aqueous alcohol when it was obtained in the form of small, bright orange-yellow needles.

The dyestuff, which may be termed 2-ethyl 1'.3'.3'-trimethyl-thioindocyanine-iodide, gives a yellow spirit solution with an absorption band at the violet-blue end of the spectrum and is a photographic sensitizer for silver chloride emulsions having a sensitizing maximum at about λ 4700 Å.

EXAMPLE IV

A mixture of 3.37 grms. (1 mol.) 1-methyl-mercapto-benzthiazole-ethiodide, and 2.13 grms. (1 mol.) 1-methyl-benzthiazole-ethochloride were dissolved by refluxing with 60 ccs. dry spirit, and 0.82 grm. (1 mol.) of anhydrous sodium acetate added. The solution assumed a yellow colour, methyl mercaptan was evolved and a yellow dyestuff began to deposit. After heating under reflux for 30 minutes the solution was poured into a beaker and water added to complete precipitation of the dyestuff.

The yellow dyestuff may be recrystallised from hot ethyl alcohol and is similar in all respects to the dyestuff known as 2.2'-diethyl-thiocyanine-iodide.

The following condensations were also carried out in an analogous manner to the above using similar molecular proportions of the reacting substances:

1-methyl-mercapto-benzthiazole ethiodide with 2.4-dimethyl-quinoline methiodide to give 1.4-dimethyl-2'-ethyl thiopseudocyanine-iodide as light red rod-shaped crystals.

1-methyl-mercapto-benzthiazole-ethiodide, and lepidine methiodide to give 2-ethyl-1'-methyl-thio-isocyanine iodide as dark red needles.

1-methyl-mercapto-benzthiazole ethiodide and α-picoline ethiodide to give 1.2'-diethyl pyrido-thio-pseudocyanine iodide as orange yellow crystals.

1-methyl-mercapto-benzthiazole ethiodide and 1-methyl-5.6-benz-benz-thiazole ethiodide to give 2.2′-diethyl-5.6-benzthiocyanine iodide as small yellow crystals melting at 315° C.

1-methyl-mercapto-benzthiazole ethiodide and 6-ethoxy-quinaldine ethiodide to give 2.1′-diethyl-6′-etoxy-thio-pseudocyanine iodide as light red needles melting at 270° C.

1-methyl-mercapto-benzthiazole ethiodide and 6-dimethyl-amino-2-methyl-quinoline ethiodide to give 2.1′-diethyl-6′-dimethyl-amino-thiopseudocyanine iodide as dark red irregular prisms.

1-methyl-mercapto-benzthiazole ethiodide and p-toluquinaldine ethiodide to give 2.1′-dimethyl-6-methyl thio-pseudocyanine iodide as light red needles.

1-methyl-mercapto-benzthiazole ethiodide and 1-methyl-benzoxazole methiodide to give 2-ethyl-2′-methyl-thio-oxacyanine iodide as light yellow crystals.

1-methyl-mercapto-benzthiazole ethyl p-toluene sulphonate and 1-methyl-4.5-dimethoxy-benzthiazole-ethyl-p-toluene sulphonate to give 2.2′-diethyl-4.5-dimethoxy-thiocyanine-p-toluene sulphonate which was converted into the bromide by pouring the hot reaction liquor into a solution of ammonium bromide. The dye was in the form of greenish yellow crystals melting at 292° C.

EXAMPLE V

*Preparation of 2′2-diethyl 5′6-benzthio-oxacarbocyanine iodide*

3.8 gms. of 1-methyl mercapto benzthiazole, 3.66 gms. of 1-methyl-α-naphthoxazole, and 8.3 gms. of ethyl para toluene sulphonate were heated together for 3½ hours at 140° C. 50 ccs. of dry spirit and 1.64 gms. anhydrous sodium acetate were then added and the whole was boiled for twenty minutes under a reflux condenser. The solution was then poured into a warm solution of potassium iodide; light yellow crystals were deposited which were filtered off and recrystallised from methyl alcohol.

The following reactions may be carried out in an analogous manner to that of Example V using similar molecular proportions of the reacting substances. Where sensitizing data is given it is the effect produced either by bathing a support coated with a light sensitive emulsion in an alcoholic solution of the dye or by incorporating the dye in the emulsion.

1 - methyl - mercapto - benzthiazole, 1-methyl-α-naphthathiazole and ethyl-p-toluene sulphonate to give 2.2′-diethyl-5.6-benzthio cyanine iodide as light yellow crystals melting at 230° C.

1-methyl-mercapto-benzthiazole, 1-methyl-4.5-dioxymethylene benzthiazole and ethyl-p-toluene sulphonate to give 2.2′-diethyl-4.5-dioxymethylene-thiocyanine bromide as yellow crystals melting at 300° C.

1-methyl-mercapto-benzthiazole, 1-methyl-4-dimethylamino benzthiazole, and ethyl-p-toluene sulphonate to give 2.2′-diethyl-4-dimethyl-amino-thio-cyanine iodide as orange crystals melting at 281° C.

1-ethyl-mercapto-4.5-dimethoxy-benzthiazole, α-picoline, and ethyl-p-toluene sulphonate to give 2.1′-diethyl-4.5-dimethoxy thio pyrido-pseudocyanine-iodide as orange coloured crystals.

1 - methyl - mercapto - 4.5 - dimethoxy - benzthiazole, quinaldine and ethyl-p-toluene sulphonate, but omitting the step of pouring the reaction liquid into potassium iodide solution, to give 2.1′-dimethoxy-thio-pseudo-cyanine-p-toluene sulphonate, as dark red needles melting at 294° C.

1-methyl-mercapto-4.5-dioxymethylene benzthiazole, α-picoline and ethyl-p-toluene sulphonate to give 2.1′-diethyl-4′5′-dioxymethylene-thiopyrido-pseudocyanine iodide as orange crystals melting at 303° C.

1-methyl-mercapto-benzoxazole, quinaldine, and ethyl-p-toluene sulphonate, to give 2.1′diethyl-oxa-pseudocyanine as golden-brown needles melting at 278° C. and sensitizing silver chloride emulsion to λ 5050 Å. with maxima at λ 4500 Å. and λ 4740 Å.

1-methyl-mercapto benzoxazole, 1.4.5-trimethyl-benzoxazole and ethyl-p-toluene sulphonate to give 2.2′-diethyl-4.5-dimethyl-oxacyanine, as pale yellow needles melting at 292-3° C. with decomposition, and sensitizing silver chloride emulsions to λ 4280 Å. with a maximum at λ 4020 Å.

1-methyl-mercapto-benzoxazole, 1-methyl-benzthiazole, and ethyl-p-toluene sulphonate to give 2.2′-diethyl-thio-oxacyanine iodide as yellow crystals melting at 304° C. with decomposition, and sensitizing silver chloride emulsions to λ 4640 Å. with a maximum at λ 4200 Å.

1-methyl-mercapto-benzoxazole, 1 - methyl - α - naphthoxazole ethyl-p-toluene sulphonate to give 2.2′-diethyl-5.6-benzoxacyanine iodide as yellow crystals melting at 310° C. and sensitizing silver chloride emulsion to λ 4300 Å. with a maximum at λ 4080 Å.

1-methyl-mercapto-benzoxazole, 1 - methyl - α - naphtha-thiazole and ethyl-p-toluene-sulphonate to give 2-2′-diethyl-5,6-benzthiooxacyanine iodide as light yellow crystals melting at 281° C., and sensitizing silver chloride emulsion to λ 4700 Å. with a maximum at λ 4350 Å.

1-methyl-mercapto-benzoxazole, 1-methyl-benzoxazole and ethyl-p-toluene sulphonate to give 2.2-diethyloxacyanine iodide as almost colourless yellowish crystals melting at 300° C. with decomposition, and sensitizing silver chloride emulsions to λ 4080 Å. with a maximum at λ 3940 Å.

1-methyl-mercapto-benzoxazole, 2 - methyl - β - naphtha thiazole, and ethyl p-toluene sulphonate, omitting the step of pouring into potassium iodide solution, to yield 2.2′-diethyl-3.4-benzthio-oxacyanine-p-toluene sulphonate as pale yellow crystals melting at 303° C. with decomposition.

The same experiment carried out with the further step of converting to the iodide gave yellow crystals, melting at 260° C. with decomposition, of 2.2′-diethyl-3.4-benz-oxacyanine iodide, which sensitizes silver chloride emulsions to λ 4350 Å. with a maximum at λ 4100 Å.

1-methyl-mercapto-benzoxazole, 1-methyl-4-dimethyl-amino-benz-thiazole and ethyl-p-toluene sulphonate to give 2.2′-diethyl-4-dimethyl-amino-thio-oxacyanine iodide as brownish yellow crystals melting at 278° C. with decomposition, and sensitising silver chloride emulsion to 5100 Å. with maxima at 4150 Å. and 4600 Å.

1-methyl-mercapto-benzoxazole,2-methyl-4.5-diphenyl oxazole and ethyl-p-toluene sulphonate to give a dyestuff as pale yellow crystals melting at 270° C. with decomposition, and sensitizing silver chloride emulsion to λ 4200 Å. with a maximum at λ 4000 Å.

1-methyl-mercapto-benzoxazole, 1.3.3-trimethyl-methylene-indole and ethyl-p-toluene sulphonate to give 1.3.3-trimethyl-2′-ethyl-indoxacyanine iodide as yellow crystals melting 281° C., and sensitising silver chloride emulsions to λ 4400 A. with a maximum at λ 4300 A.

1-methyl-mercapto - 4.5 - dimethyl benzoxazole, 1.4.5-trimethyl-benzoxazole and ethyl-p-toluene sulphonate, to give 2.2'.4.5.4'.5-tetramethyl-oxycyanine-iodide as yellow needles melting at 311° C. with decomposition.

1 - methyl - mercapto-4.5-dimethyl - benzoxazole, quinaldine, and ethyl-p-toluene sulphonate to give 2.1'-diethyl-4.5-dimethyl-oxapseudocyanine iodide as orange red crystals melting at 286° C. with decomposition.

1 - methyl - mercapto-4.5-dimethyl - benzoxazole, 2.3.3-trimethyl indolenine and ethyl-p-toluene sulphonate to give 1.3.3.4.5'-pentamethyl-2'-ethyl-indoxacyanine iodide as yellow crystals melting at 290° C. and sensitising silver chloride emulsions to λ 4550 A. maximum λ 4320 A.

1-methyl-mercapto-4.5-dimethyl-benzoxazole, 2-methyl-β-naphthoxazole and ethyl-p-toluene sulphonate to give 2.2'- diethyl-3.4,-benz-4'.5'-dimethyl oxacyanine iodide as light yellow crystals melting at 300° C. with decomposition.

1-methyl-mercapto-4.5-dimethyl-benzoxazole, 2-methyl-β-naphthathiazole and ethyl-p-toluene-sulphonate, omitting the step of pouring the reaction mixture into potassium iodide solution, to give 2.2'-diethyl-3.4-benzthio-4'.5'-dimethyl oxacyanine-p-toluene sulphonate as yellow crystals melting at 303° C. with decomposition.

1 - methyl - mercapto-4.5-dimethyl - benzoxazole, 2.4-dimethyl-thiazole, and ethyl-p-toluene sulphonate to give 1.2'-diethyl-4.4'.5'-trimethyl-thiazolooxacyanine-iodide as yellow crystals melting at 298° C. and sensitising silver chloride emulsion to λ 4400 A. with a maximum at λ 4150 A.

1-methyl-mercapto-5-methyl - benzoxazole, quinaldine, and ethyl-p-toluene sulphonate to give 2.1'-diethyl-5-methyl-oxapseudo-cyanine iodide as yellow needles melting at 298° C. with decomposition.

1-methyl-mercapto - 5 - methyl-benzoxazole, 2-methyl-β-naphthathiazole, and ethyl-p-toluene sulphonate (omitting the step of conversion into the iodide), to give 2.2'-diethyl-3.4-benzthio-5'- methyl - oxacyanine - p - toluene-sulphonate, as light yellow crystals melting at 299° C. with decomposition.

1-methyl-mercapto-5-methyl-benzoxazole, 1.5-dimethyl benzoxazole, and ethyl-p-toluene-sulphonate to give 2.2'-diethyl-5.5'-dimethyl-oxacyanine-iodide as pale yellow crystals melting at 306° C. with decomposition.

1-methyl-mercapto-5-methyl-benzoxazole, 1.3.3.-trimethyl methylene indole, and ethyl-p-toluene sulphonate to give 1.3.3.5'-tetramethyl-2'-ethyl-indoxacyanine iodide as red brown crystals melting at 240° C. with decomposition, and sensitising silver chloride emulsion to λ 4500 A. with maxima at λ 4300 A. and λ 4100 A.

2-methyl-mercapto-β-naphthoxazole, 2-methyl-β-naphthoxazole and ethyl-p-toluene sulphonate to give 2.2'-diethyl-3.4.3'4'-dibenzoxacyanine iodide as light yellow crystals melting at 262° C. with decomposition, and sensitising silver chloride emulsions to λ 4350 A. with maxima at λ 4000 A. and λ 4200 A. and a minimum at λ 4100 A.

2-methyl-mercapto-β-naphthoxazole, quinaldine, and ethyl-p-toluene sulphonate to give 2.1'-diethyl-3.4-benzoxa-pseudocyanine iodide as orange crystals, melting at 270-2° C. with decomposition, and sensitising silver chloride emulsion to λ 5380 A with a maximum at λ 5000 A. and a minimum at λ 4000 A.

2-methyl-mercapto - β - napthoxazole, lepidine, and ethyl-p-toluene sulphonate to give 2.1'-diethyl-3.4-benzoxaisocyanine iodide as orange red needles, melting at 263° C. with decomposition, and sensitising silver chloride emulsion from λ 4300 A. to λ 5500 A. with maxima at λ 4800 A. and λ 5200 A.

2-methyl - mercapto-β-napthoxazole, 1.3.3.-trimethylmethylene-indole and ethyl-p-toluene-sulphonate to give 1.3.3.-trimethyl-2'-ethyl-3.4.-indobenzoxacyanine iodide as yellow crystals melting at 246° C. with decomposition, and sensitising silver chloride emulsions to λ 4720 A. with maxima at λ 4560 A. and λ 4300 A.

EXAMPLE VI

*Preparation of 1-ethyl-1.4-dimethyl-thiopseudo-cyanine-iodide*

3.50 grams of 1-methyl-quinoline-2-thione, 2.26 grams of 2.4-dimethyl-thiazole and 8-grams of ethyl-p-toluene sulphonate were heated together at 140-150° C. for 3½ hours and then 20 ccs. of pyridine were added and the whole boiled for 15 minutes and then poured into a solution of 12 grams of potassium iodide in 300 ccs. of water, when the dye separated out, was filtered off, and recrystallised from methyl alcohol, as red needles melting at 239° C.

An analogous reaction was carried out with 1-methyl-quinoline-2-thione, quinaldine and ethyl-p-toluene sulphonate to give 1-methyl-1'-ethyl-pseudocyanine-iodide as red crystals.

One advantage of the process according to the invention is that in most cases a substantially pure product is obtained in a very good yield.

Some of the dyestuffs produced in accordance with the invention are of particular use in the photographic industry for incorporation in light sensitive emulsions as photographic sensitizing agents.

The dyestuffs may be incorporated in the silver halide emulsion before it is applied to the film or plate or the emulsion-coated film may be passed through a bath containing the dyestuffs.

It will be understood that where the term "methyl-mercapto," such as in 1-methyl-mercapto-benzthiazole, is used in this specification and claims it is intended to signify the group —S—CH₃.

I claim:

1. A process for the production of cyanine compounds which comprises mixing together a heterocyclic nitrogen base of the type used in cyanine dyes containing a reactive methyl group in a position selected from the α and γ positions to the ring nitrogen atom, an organic compound of the general formula:

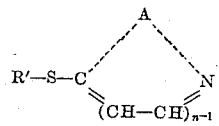

wherein R' is an alkyl group, A constitutes the atoms necessary to complete a heterocyclic nitrogen nucleus of the type used in cyanine dyes and $n$ is a positive integer less than 3, and a sfficient amount of an alkyl-para-toluene sulphonate required to form the quaternary ammonium salts of said heterocyclic nitrogen base and said organic compound, and heating the whole mixture.

2. A process as set for in claim 1 wherein an ethyl para-p-toluenesulphonate is used.

3. A process as claimed in claim 1 including adding a suitable solvent and an acid binding substance after partial condensation has been effected.

4. A process as claimed in claim 1 including adding alcohol and sodium acetate after partial condensation has been effected.

5. A process as claimed in claim 1 including adding a solvent which is also an acid binding substance after partial condensation has been effected.

JOHN DAVID KENDALL.